United States Patent
Wayda et al.

(10) Patent No.: US 8,001,345 B2
(45) Date of Patent: Aug. 16, 2011

(54) AUTOMATIC TRIGGERING OF BACKING STORE RE-INITIALIZATION

(75) Inventors: James George Wayda, Laguna Niguel, CA (US); Kent Lee, Ladera Ranch, CA (US); Ngoclan Thi Vu, Irvine, CA (US); Elizabeth G. Rodriguez, Carlsbad, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 428 days.

(21) Appl. No.: 11/747,109

(22) Filed: May 10, 2007

(65) Prior Publication Data
US 2008/0281875 A1    Nov. 13, 2008

(51) Int. Cl.
G06F 12/14    (2006.01)
G06F 11/08    (2006.01)
(52) U.S. Cl. ........................................ 711/162
(58) Field of Classification Search .................. 711/161, 711/162
See application file for complete search history.

(56) References Cited

U.S. PATENT DOCUMENTS

| | | |
|---|---|---|
| 5,551,046 A | 8/1996 | Mohan et al. |
| 5,778,189 A | 7/1998 | Kimura et al. |
| 5,812,843 A | 9/1998 | Yamazaki et al. |
| 5,963,962 A | 10/1999 | Hitz et al. |
| 6,073,209 A | 6/2000 | Bergsten |
| 6,289,356 B1 | 9/2001 | Hitz et al. |
| 6,292,808 B1 | 9/2001 | Obermarck et al. |
| 6,341,341 B1 | 1/2002 | Grummon et al. |
| 6,548,634 B1 | 4/2003 | Ballinger et al. |
| 6,557,079 B1 | 4/2003 | Mason, Jr. et al. |
| 6,594,744 B1 | 7/2003 | Humlicek et al. |
| 6,615,223 B1 | 9/2003 | Shih et al. |
| 6,771,843 B1 | 8/2004 | Huber et al. |
| 6,907,512 B2 | 6/2005 | Hill et al. |
| 7,047,380 B2 | 5/2006 | Tormasov et al. |
| 7,050,457 B2 | 5/2006 | Erfurt et al. |
| 7,100,089 B1 | 8/2006 | Phelps |
| 7,165,156 B1 | 1/2007 | Cameron et al. |
| 7,191,304 B1 | 3/2007 | Cameron et al. |
| 7,194,550 B1 | 3/2007 | Chamdani et al. |
| 7,206,961 B1 | 4/2007 | Mutalik et al. |

(Continued)

FOREIGN PATENT DOCUMENTS

| | | |
|---|---|---|
| CA | 2165912 | 6/1997 |
| EP | 1003103 | 5/2000 |
| WO | WO9429807 | 12/1994 |
| WO | WO 0250716 | 6/2002 |
| WO | WO2005111773 | 11/2005 |
| WO | WO2005111802 | 11/2005 |

OTHER PUBLICATIONS

Written Opinion from the PCT dated Mar. 27, 2007 with regard to corresponding PCT Application No. PCT/US/06/32506, 10 pages.

(Continued)

*Primary Examiner* — Brian Peugh
*Assistant Examiner* — Nicholas Simonetti
(74) *Attorney, Agent, or Firm* — Thomas J. Lavan; Matthew Ryan Ellsworth

(57) ABSTRACT

A method, device, and system are provided for determining when to re-initialize a backing store in a data storage system. More specifically, when all snapshots associated with a specified backing store are either being deleted or are marked for deletion the backing store is re-initialized rather than deleting each snapshot independently. The re-initialization of the backing store provides for a quicker way to delete all snapshots than can be achieved by deleting each snapshot independently.

20 Claims, 6 Drawing Sheets

U.S. PATENT DOCUMENTS

| | | | |
|---|---|---|---|
| 7,243,157 B2 | 7/2007 | Levin et al. | |
| 7,313,581 B1 | 12/2007 | Bachmann et al. | |
| 7,363,444 B2 | 4/2008 | Ji et al. | |
| 7,373,366 B1 | 5/2008 | Chatterjee et al. | |
| 7,426,618 B2 | 9/2008 | Vu et al. | |
| 7,526,640 B2 | 4/2009 | Bazan Bejarano | |
| 2001/0039629 A1 | 11/2001 | Feague et al. | |
| 2002/0083037 A1 | 6/2002 | Lewis et al. | |
| 2002/0091670 A1 | 7/2002 | Hitz et al. | |
| 2002/0099907 A1 | 7/2002 | Castelli et al. | |
| 2002/0112084 A1 | 8/2002 | Deen et al. | |
| 2003/0154314 A1 | 8/2003 | Mason et al. | |
| 2003/0158863 A1 | 8/2003 | Haskin et al. | |
| 2003/0167380 A1* | 9/2003 | Green et al. | 711/136 |
| 2003/0188223 A1* | 10/2003 | Alexis | 714/13 |
| 2003/0191745 A1 | 10/2003 | Jiang et al. | |
| 2003/0229764 A1 | 12/2003 | Ohno et al. | |
| 2004/0030727 A1 | 2/2004 | Armangau | |
| 2004/0030846 A1* | 2/2004 | Armangau et al. | 711/154 |
| 2004/0030951 A1 | 2/2004 | Armangau | |
| 2004/0034647 A1 | 2/2004 | Paxton et al. | |
| 2004/0054131 A1 | 3/2004 | Ballinger et al. | |
| 2004/0093555 A1 | 5/2004 | Therrien et al. | |
| 2004/0117567 A1 | 6/2004 | Lee et al. | |
| 2004/0133718 A1 | 7/2004 | Kodama et al. | |
| 2004/0172509 A1 | 9/2004 | Takeda et al. | |
| 2004/0204071 A1 | 10/2004 | Bahl et al. | |
| 2004/0260673 A1 | 12/2004 | Hitz et al. | |
| 2004/0267836 A1 | 12/2004 | Armangau et al. | |
| 2005/0004979 A1* | 1/2005 | Berkowitz et al. | 709/203 |
| 2005/0044088 A1 | 2/2005 | Lindsay et al. | |
| 2005/0065985 A1 | 3/2005 | Tummala et al. | |
| 2005/0066128 A1 | 3/2005 | Yagisawa et al. | |
| 2005/0071393 A1 | 3/2005 | Ohno et al. | |
| 2005/0122791 A1 | 6/2005 | Hajeck | |
| 2005/0166022 A1 | 7/2005 | Watanabe | |
| 2005/0182910 A1 | 8/2005 | Stager et al. | |
| 2005/0193180 A1 | 9/2005 | Fujibayashi et al. | |
| 2005/0198452 A1 | 9/2005 | Watanabe | |
| 2005/0240635 A1* | 10/2005 | Kapoor et al. | 707/200 |
| 2005/0246397 A1 | 11/2005 | Edwards et al. | |
| 2005/0246503 A1 | 11/2005 | Fair | |
| 2006/0020762 A1 | 1/2006 | Urmston | |
| 2006/0053139 A1* | 3/2006 | Marzinski et al. | 707/101 |
| 2006/0064541 A1 | 3/2006 | Kano et al. | |
| 2006/0107006 A1* | 5/2006 | Green et al. | 711/162 |
| 2006/0155946 A1* | 7/2006 | Ji | 711/162 |
| 2006/0212481 A1 | 9/2006 | Stacey et al. | |
| 2006/0271604 A1 | 11/2006 | Shoens | |
| 2007/0038703 A1 | 2/2007 | Tendjoukian et al. | |
| 2007/0055710 A1 | 3/2007 | Malkin et al. | |
| 2007/0094466 A1 | 4/2007 | Sharma et al. | |
| 2007/0100808 A1 | 5/2007 | Balogh | |
| 2007/0143563 A1 | 6/2007 | Pudipeddi et al. | |
| 2007/0185973 A1 | 8/2007 | Wayda et al. | |
| 2007/0186001 A1 | 8/2007 | Wayda et al. | |
| 2007/0198605 A1 | 8/2007 | Saika | |
| 2007/0266066 A1 | 11/2007 | Kapoor et al. | |
| 2007/0276885 A1 | 11/2007 | Valiyaparambil et al. | |
| 2008/0072003 A1 | 3/2008 | Vu et al. | |
| 2008/0082593 A1 | 4/2008 | Komarov et al. | |
| 2008/0114951 A1 | 5/2008 | Lee | |
| 2008/0177954 A1 | 7/2008 | Lee | |
| 2008/0177957 A1 | 7/2008 | Lee | |
| 2008/0256141 A1 | 10/2008 | Wayda et al. | |
| 2008/0256311 A1 | 10/2008 | Lee | |
| 2008/0281877 A1 | 11/2008 | Wayda et al. | |
| 2008/0320258 A1 | 12/2008 | Wayda et al. | |

OTHER PUBLICATIONS

International Search Report from the PCT dated Mar. 27, 2007 with regard to corresponding PCT Application No. PCT/US/06/32506, 3 pages.

International Preliminary Report on Patentability and Written Opinion from the PCT dated Mar. 20, 2008 with regard to corresponding PCT Application No. PCT/US/06/32506, 10 pages.

Notice of Allowance in U.S. Appl. No. 11/277,738, Mar. 20, 2008, 6 pages.

Office Action in Application in U.S. Appl. No. 11/277,738, Dec. 6, 2007, 9 pages.

Office Action in Application in U.S. Appl. No. 11/277,738, Jul. 31, 2007, 8 pages.

Office Action in Application in U.S. Appl. No. 11/277,738, Apr. 3, 2007, 14 pages.

International Search Report from the PCT dated Aug. 7, 2008 with regard to corresponding PCT Application No. PCT/US/08/57326, 2 pages.

Written Opinion from the PCT dated Aug. 7, 2008 with regard to corresponding PCT Application No. PCT/US/08/57326, 6 pages.

Official Action for U.S. Appl. No. 11/624,524, mailed Dec. 11, 2008.

Notice of Allowance for U.S. Appl. No. 11/560,174, mailed Feb. 2, 2009.

Official Action for U.S. Appl. No. 11/561,512, mailed Jun. 25, 2009.

Office Action in U.S. Appl. No. 11/561,512, Apr. 3, 2009, 11 pages.

Official Action for U.S. Appl. No. 11/560,174, mailed Sep. 5, 2008.

Official Action for U.S. Appl. No. 11/624,524, mailed Jun. 16, 2009.

Official Action for U.S. Appl. No. 11/624,565, mailed Mar. 30, 2009.

Official Action for U.S. Appl. No. 11/734,081, mailed May 8, 2009.

Analysis from foreign associate dated Oct. 22, 2009 from 1st office action from Chinese patent office for application 200680032724.8.

Office Action in U.S. Appl. No. 11/561,512, Oct. 30, 2009, 9 pages.

Official Action for U.S. Appl. No. 11/747,127, mailed Oct. 6, 2009.

Official Action for U.S. Appl. No. 11/624,524, mailed Sep. 16, 2009.

Official Action for U.S. Appl. No. 11/734,081, mailed Aug. 21, 2009.

International Preliminary Report on Patentability and Written Opinion from the PCT dated Oct. 22, 2009 with regard to corresponding PCT Application No. PCT/US/08/57326, 10 pages.

Office Action in U.S. Appl. No. 11/561,512, Dec. 10, 2009.

Official Action for U.S. Appl. No. 11/747,127, mailed Jan. 6, 2010.

Official Action for U.S. Appl. No. 11/624,565, mailed Nov. 30, 2009.

Office Action in U.S. Appl. No. 11/561,512, Mar. 18, 2010.

Office Action in U.S. Appl. No. 11/779,965, Jan. 29, 2010.

Official Action for U.S. Appl. No. 11/945,940, mailed Mar. 5, 2010.

Official Action for U.S. Appl. No. 11/624,524, mailed Jan. 26, 2010.

Notice of Allowance for U.S. Appl. No. 11/734,081, mailed Feb. 2, 2010.

Notice of Allowance for U.S. Appl. No. 11/734,081, mailed Mar. 10, 2010.

Office Action in U.S. Appl. No. 11/561,680, Nov. 5, 2010.

Notice of Allowance for U.S. Appl. No. 11/624,565, mailed Sep. 29, 2010.

Official Action for U.S. Appl. No. 11/768,127, mailed Nov. 3, 2010.

Office Action in U.S. Appl. No. 11/779,965, Dec. 16, 2010.

Notice of Allowance for U.S. Appl. No. 11/747,127, mailed May 14, 2010.

Notice of Allowance for U.S. Appl. No. 11/747,127, mailed Jun. 2, 2010.

Notice of Allowance for U.S. Appl. No. 11/747,127, mailed Jun. 15, 2010.

Official Action for U.S. Appl. No. 11/768,127, mailed Apr. 2, 2010.

Official Action for U.S. Appl. No. 11/768,127, mailed Jun. 1, 2010.

Notice of Allowance for U.S. Appl. No. 11/945,940, mailed Jun. 18, 2010.

Examiner's answer in U.S. Appl. No. 11/561,512, Sep. 2, 2010.

Notice of Allowance for U.S. Appl. No. 11/945,940, mailed Jul. 13, 2010.

Notice of Allowance for U.S. Appl. No. 11/747,127, mailed Jul. 13, 2010.

Notice of Allowance for U.S. Appl. No. 11/624,565, mailed Sep. 14, 2010.

Examiner's answer for U.S. Appl. No. 11/624,524, mailed Sep. 10, 2010.

Official Action for U.S. Appl. No. 12/780,891, mailed Sep. 20, 2010.

Office Action in U.S. Appl. No. 11/779,965, Jun. 24, 2010.

Office Action in U.S. Appl. No. 11/561,680, Apr. 15, 2011.

Official Action for U.S. Appl. No. 12/780,891, mailed Mar. 25, 2011.

* cited by examiner

AUTOMATIC TRIGGERING OF BACKING STORE RE-INITIALIZATION

CROSS REFERENCE TO RELATED APPLICATIONS

This application is related to U.S. patent application Ser. No. 11/747,127, filed May 10, 2007, entitled Backing Store Re-Initialization Method and Apparatus.

FIELD

The present invention is directed to data storage management. In particular, the present invention is directed to methods and apparatuses for making a determination to re-initialize a backing store.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume. Indeed, data storage systems are available that can provide at least limited data archiving through backup facilities and/or snapshot facilities. The use of snapshot facilities greatly reduces the amount of storage space required for archiving large amounts of data. However, there are still times where it is desirable to delete a snapshot to conserve storage space.

Current processes employed to delete snapshots are efficient enough at independently deleting such snapshots. When a snapshot is deleted a number of different tasks need to be performed to ensure that artifacts from the deleted snapshot do not remain thereby disrupting or possibly corrupting subsequent snapshots. The deletion of a single snapshot may take up to a couple of seconds or more before it is completely deleted.

A drawback to some snapshot facilities is that only one snapshot, or sometimes one snapshot per backing store, may be deleted at a time. As used herein, a "backing store", which may also be referred to as a snap pool, is a storage location where all snapshot related data and metadata is recorded. Accordingly, when more than one snapshot is marked for deletion a delete queue has to be formed. While a snapshot is in the process of being deleted all other snapshots that are marked for deletion remain in the delete queue. In the event that a large number of snapshots are marked for deletion, for example after a rollback process has been performed in response to data corruption on a master volume, the act of incrementally deleting each snapshot marked for deletion may take a relatively long time. Meanwhile, storage resources are occupied by snapshots awaiting their turn for deletion. The net result is that the storage resources cannot be allocated for maintaining data for current snapshots until the resources occupied by deleted snapshots are processed and freed. This may cause some amount of frustration for a user that has to wait until all resources corresponding to deleted snapshots are freed before the user can create a new snapshot of the master volume. Although the user is not able to see how the resources are allocated and it appears as though the snapshots are already deleted, these restrictions nevertheless may cause the user frustration if they have to wait to create a new snapshot.

SUMMARY

The present invention is directed to solving these and other problems and disadvantages of the prior art. In accordance with embodiments of the present invention, a service for determining when to re-initialize and for subsequently re-initializing a backing store is provided. In accordance with embodiments of the present invention, a method of determining when re-initialization of a backing store is appropriate is provided. The method generally includes receiving a request to delete a snapshot from a given backing store. Upon receiving the request, determining whether all other snapshots stored on the backing store are being deleted and/or marked for deletion (i.e., in the delete queue). After a determination is made that all snapshots stored on a backing store are being deleted and/or marked for deletion, the re-initialization of the backing store is initiated. In accordance with further embodiments of the present invention, re-initializing a backing store causes all snapshots stored on that backing store to be deleted at substantially the same time. That is, the snapshots are deleted simultaneously and immediately in response to a processor issuing the request to delete all snapshots.

In accordance with other embodiments of the present invention, a method for executing backing store re-initialization is provided. The method is generally initiated upon receiving a request to re-initialize a backing store, although a decision to re-initialize may be made internally and automatically, thereby obviating the need to receive a request to re-initialize the backing store. Once it is determined that the backing store is to be re-initialized, the method generally includes the step of identifying a data map used to indicate that chunks on the backing store are assigned to a particular snapshot or snapshot data. Thereafter, the data map is cleared while the snapshot data from the number of snapshots on the backing store is maintained in the backing store on data storage chunks until a new snapshot is created on the backing store. Clearing the data map allows new snapshots to be taken without going through the time consuming process of identifying and deleting data from each data storage chunk. Rather, the data storage chunk is marked as available and can be rewritten when a new snapshot is created.

In accordance with further embodiments of the present invention, a snapshot management device is provided. The snapshot management device is characterized by the ability to determine when a selected backing store may be re-initialized and in response to making such a determination, re-initialize the selected backing store. In accordance with embodiments of the present invention, the snapshot management device comprises a snapshot delete application that is capable of independently deleting snapshots from a backing store. The snapshot management device may also comprise a monitoring application capable of monitoring the snapshot delete application in addition to monitoring the status of snapshots.

The snapshot management device may further include a re-initialization application that is characterized by the capacity to simultaneously delete two or more snapshots. The re-initialization application may preempt the snapshot delete application in response to receiving a command from the monitoring application indicating that all snapshots associated with a given backing store are either being deleted or are marked for deletion. In accordance with embodiments of the present invention, the re-initialization application is operable to preempt the snapshot delete application and delete a number of snapshots at the same time by re-initializing the backing store on which the snapshots are stored.

In accordance with still further embodiments of the present invention, a re-initialization system characterized by the ability to delete a number of snapshots at the same time is provided. The system generally comprises a master storage volume, a backing store used to store snapshots of the master volume, and at least one data map (e.g., an allocation bitmap) comprising data used to indicate if a particular chunk of the backing store is in use (e.g., by a snapshot). The system may also include present bitmaps or similar data maps for identifying which, if any, memory location contains user data on the backing store. The system may further include a re-initialization application operable to clear all data maps associated with a given backing store at substantially the same time. Clearing the data maps, especially an allocation bitmap, provides the indication that the chunk is freed and can be reused by another snapshot.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a master storage volume. The data is essentially frozen in time at the instant that the snapshot is taken. Although data on the master storage volume may change as a result of write operations, the data within the snapshot will remain constant and frozen in time at the instant that the snapshot was taken. In order to preserve snapshot data, a backing store is used to store data that is not otherwise represented in the storage volume along with snapshot metadata. All data and metadata associated with the snapshot is stored in the backing store. In accordance with embodiments of the present invention, data is stored for a snapshot in "chunks" on the backing store. A chunk is equivalent to a number of Logical Block Addresses (LBAs). Alternatively or in addition, data can be stored within subchunks. A subchunk is a fixed size subset of a chunk. Pointers or table entries can be used to identify the location of a chunk in the backing store. In accordance with embodiments of the present invention, table entries or data maps may contain a chunk address or chunk addresses used to locate snapshot data on a backing store.

Figure 1:
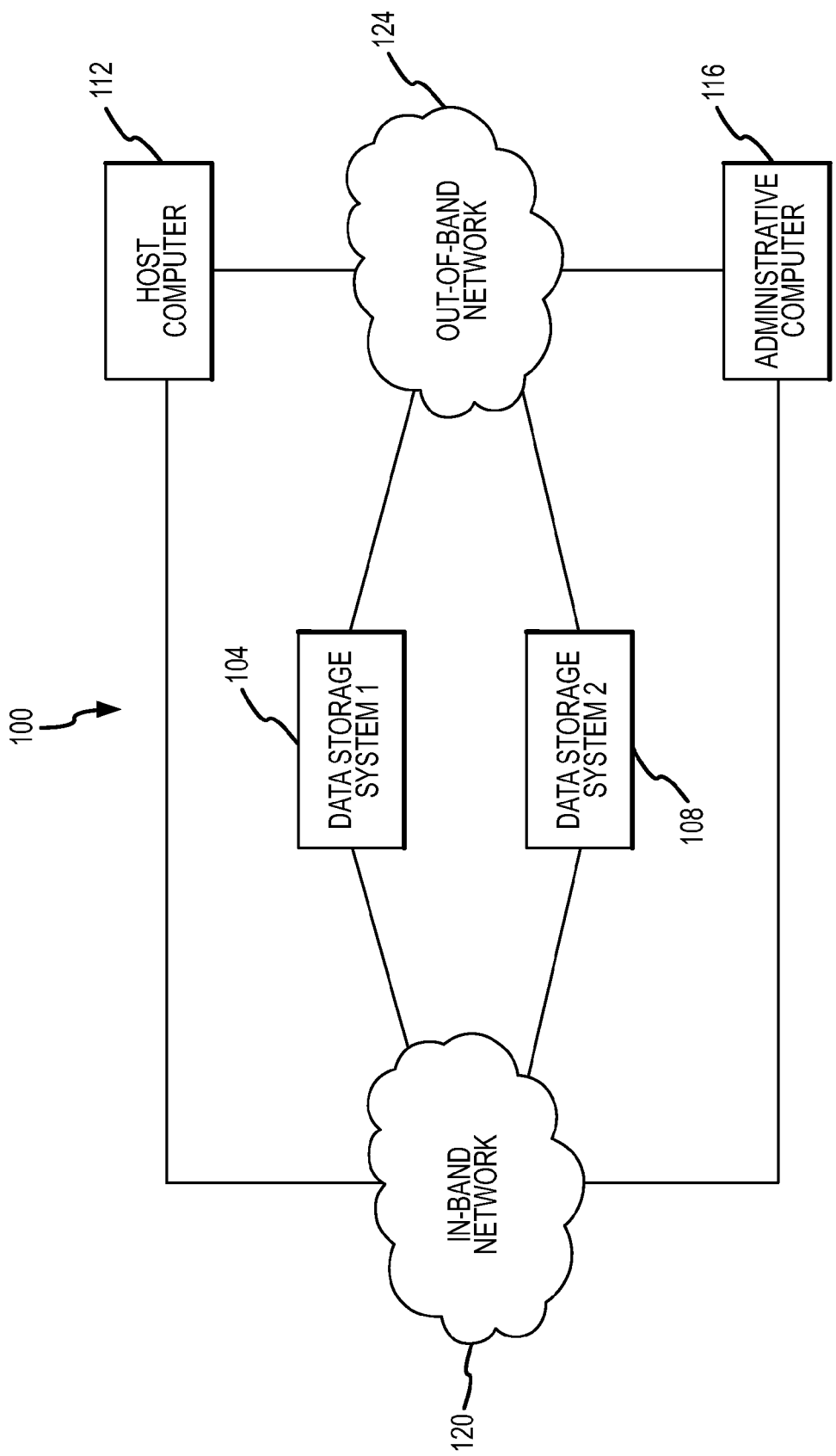
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104 and a second data storage system 108. The electronic data system 100 may also include one or more host processors, computers or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) networks. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrator computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
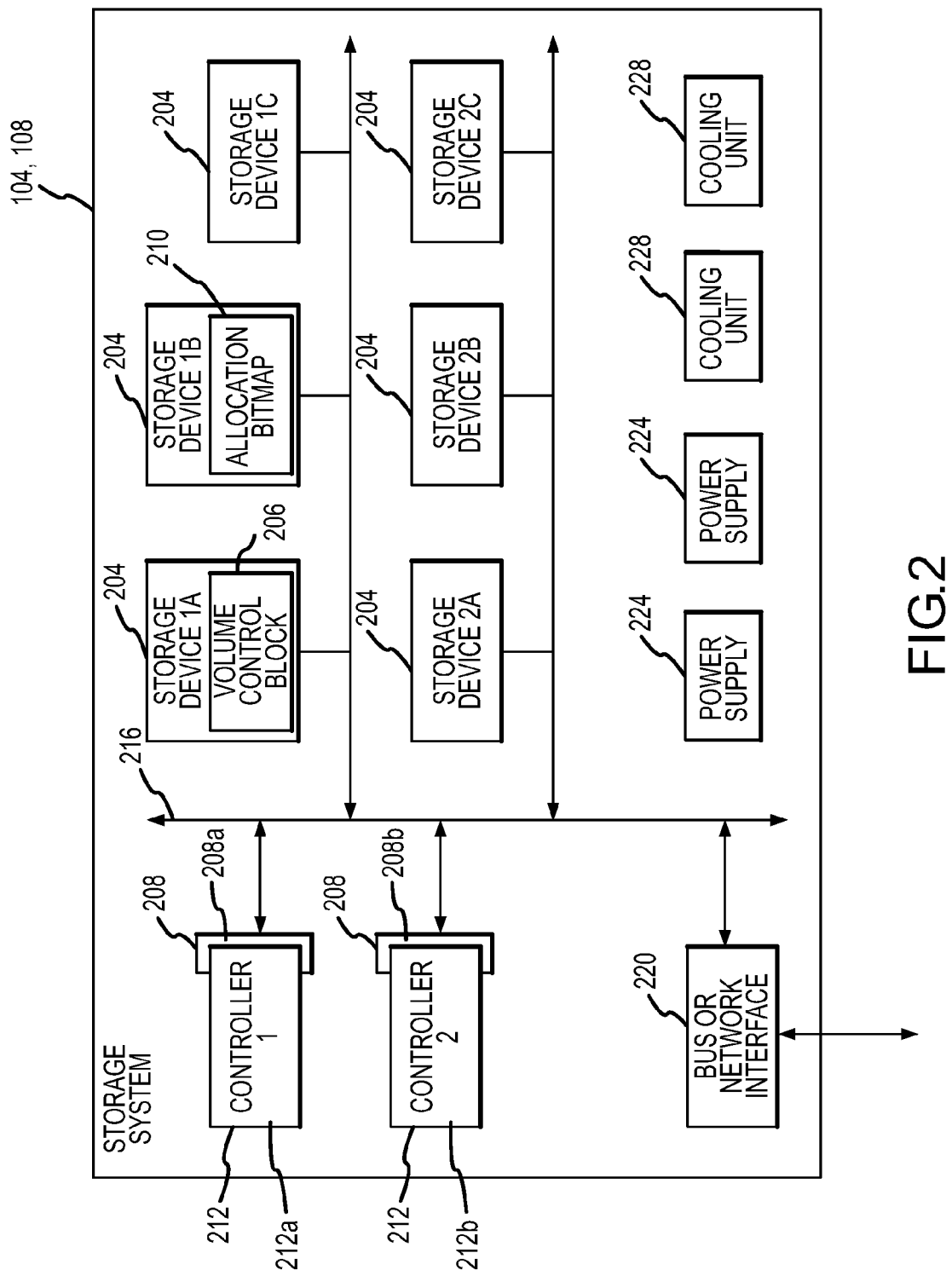
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), serial attached SCSI (SAS), Fibre Channel (FC), or parallel advanced technology attached (PATA) hard disk drives. Other examples of storage devices 204 include magnetic tape storage devices, optical storage devices or solid state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as logical unit numbers (LUNs) comprising a storage volume, may be established on the data storage devices 204. As can be further appreciated by one of skill in the art, a LUN may be implemented in accordance with any one of the various array levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. As can also be appreciated by one of skill in the art, the storage devices 204 contain data comprising a master storage volume, which may correspond to a LUN, and one or more snapshots of the storage volume taken at different times. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116.

In addition to the storage device 204 maintaining master storage volumes and/or backing stores, one or more storage devices 204 may maintain a volume control block 206 or plurality of volume control blocks. A volume control block 206 represents a data structure used to configure and manage metadata for master volumes, backing stores, and/or snapshots. More specifically, a volume control block 206 may comprise a fixed size record, for example a 64 KB sized record, located in an array partition metadata that is associated with a backing store array partition. Different volume control blocks 206 may be created to store information related a corresponding array partition (e.g., master volume, backing store, and/or snapshot). There is typically a one-to-one relationship between a volume control block 206 and an array partition.

In accordance with one embodiment of the present invention, the volume control block 206 may be used to store a list of volume control block master groups. A volume control block master group is an association of a master volume with each of its snapshots. The volume control block master group may be incorporated into a backing store volume control block 206. Thus, a single backing store volume control block 206 may describe all of the master volumes and their respective snapshots that are associated with a particular backing store. In other words, backing store volume control blocks 206 may comprise data describing all master volume snapshots stored on a backing store, where snapshots of different master volumes may be maintained on a single backing store. The data stored in connection with the volume control block master group may include, but is not limited to, the master volume identifier (e.g., serial number of the master volume), flags or indicator bits for indicating various states related to the master volume (e.g., rollback flags, offline flags, etc.), total number of active snapshots in the master group, index to snapshot volume control blocks 206 that contain the most recent snapshots, and actual snapshot volume control blocks 206.

Another type of volume control block 206 that may be maintained on the storage device 204 is a snapshot volume control block 206. The type of data that may be stored in connection with a snapshot volume control block 206 includes, without limitation, the snapshot volume identifier (e.g., serial number of the snapshot volume), volume control block master group index, flags or indicator bits for indicating various states related to the snapshot (e.g., in use flags, delete in progress flags, marked for deletion flags, delete complete flags, rollback in progress flags, etc.), location of allocation bitmap, size of snapshot volume, size of expanded snapshot, and the like.

The storage devices 204 may be further employed to maintain a data map 210. In accordance with one embodiment of the present invention, the data map 210 comprises an allocation bitmap. The data map 210 is useful in managing the organization of snapshot data. Accordingly, the data map 210 may be embodied as any data table or map mown in the computer arts.

In accordance with one embodiment, the data map 210 is used to indicate the chunk allocation in a backing store. More specifically, the data map 210 describes whether a particular chunk is assigned to a snapshot. If the data map 210 indicates that a chunk is assigned to a snapshot, then the chunk may have snapshot data stored therein. On the other hand, if the data map 210 indicates that a chunk is not assigned to a snapshot, then the chunk is available to store data for other snapshots. In accordance with one embodiment of the present invention, however, simply because the data map 210 indicates that a chunk is free does not mean that the chunk does not contain data. Rather, the chunk may still contain data from the previously assigned snapshot but since the data map 210 indicates the chunk is not assigned, then data from a new snapshot may be written to the chunk thereby replacing the old data.

In accordance with one embodiment of the present invention, the data map 210 is maintained on the storage device 204 due to its potential size. However, when a controller 212 needs to access the data map 210, some or all of the data from the data map 210 may be pulled into memory of the controller 212 for direct access. In an alternative embodiment, the data map 210 may be maintained entirely in controller 212 memory and may not need to be stored on a storage device 204.

A data storage system 104, 108 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller. As can be appreciated by one of skill in the art, the provision of two controllers, 212a to 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general purpose computer. As further examples, the storage system 104 may comprise a Just a Bunch of Disks (JBOD) system or a Switched Bunch of Disks (SBOD) system.

Figure 3:
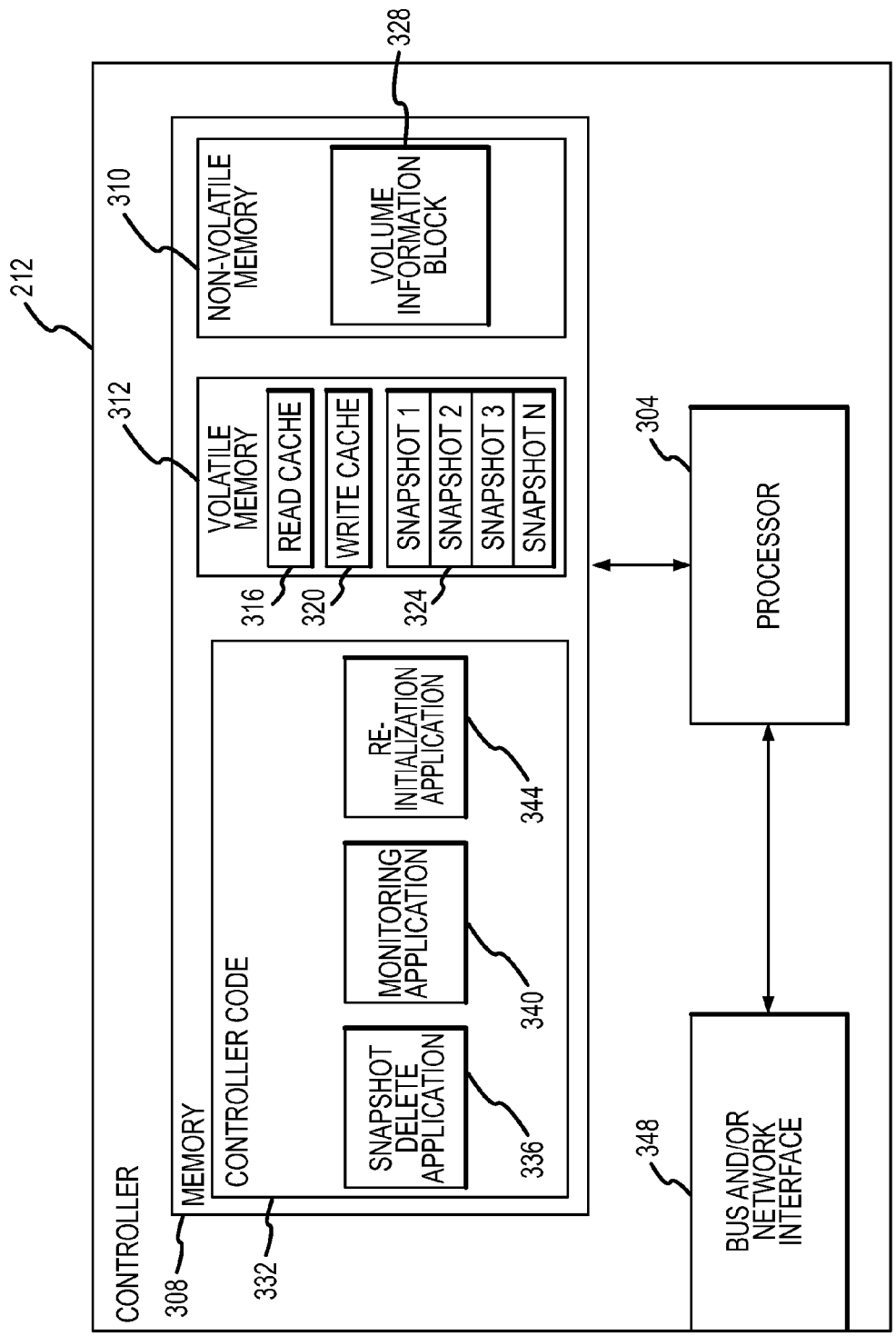
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a backing store re-initialization method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device, or a number of solid-state memory devices. In addition, the memory 308 may include separate non-volatile memory 310 and volatile memory 312 portions. As can be appreciated by one of skill in the art, the memory 308 may include a read cache 316 and a write cache 320 that are provided as part of the volatile memory 312 portion of the memory 308, although other arrangements are possible. By providing caches 316, 320, a storage controller 212 can improve the speed of input/output (IO) operations between a host 112 and the data storage devices 204 comprising an array or array partition. Examples of volatile memory 312 include DRAM and SDRAM.

The volatile memory 312 may further be employed to store a snapshot delete queue 324. The snapshot delete queue 324 may be dynamically generated in response to receiving a command to delete a snapshot while another snapshot is currently being deleted. As additional requests are received to delete various snapshots from the backing store, the delete queue 324 may continue to be populated. When the deletion of a snapshot has completed, the snapshot that has resided in delete queue 324 for the longest amount of time may be removed from the delete queue 324 for subsequent deletion. In this way, the delete queue 324 may be operated in a first-in-first-out (FIFO) type methodology. However, the delete queue 324 may be managed according to other methodologies such as a last-in-first-out (LIFO) type methodology or by ordering snapshots based upon their size or associated master volume.

The non-volatile memory 310 may be used to store data that was written to the write cache of memory 308 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

A volume information block 328 may be stored in the nonvolatile memory 310, although in accordance with at least some embodiments of the present invention, the volume information block 328 resides in volatile memory 312. The volume information block 328 comprises data that may be used to represent attribute and state information for master volumes, backing stores, and/or snapshots. Each master volume, backing store, and snapshot is typically associated with a different volume information block 328. The volume information block 328 is generally employed by the processor 304 to determine whether certain data is located on master volumes, backing stores, and/or snapshots and whether such data is safe to access based on the state of each. For example, the state of a master volume or backing store may be such that if data access were attempted, data corruption may occur. Accordingly, the volume information block 328 may be referenced prior to data access.

The memory 308 also includes portions of the memory 308 comprising a region that provides storage for controller code 332. The controller code 332 may comprise a number of components, including a snapshot delete process or application 336 comprising instructions for deleting a snapshot from a backing store as described herein. The snapshot delete application 336 may be operable to delete snapshots independently. Further details of the snapshot delete application 336 are described more fully in U.S. patent application Ser. No. 11/560,174, filed on Nov. 15, 2006, the entire contents of which are hereby incorporated herein by this reference. As noted above, the snapshot delete application 336 is generally limited in the number of snapshots that it can simultaneously delete. In one embodiment, the snapshot delete application 336 is only operable to delete snapshots one at a time.

A monitoring application 340 is an example of another application that may be included in the controller code 332 in accordance with embodiments of the present invention. The monitoring application 340 is operable to monitor the deletion state for each snapshot associated with a backing store. More specifically, the monitoring application 340 can monitor and track the snapshots that are being and have been deleted by the snapshot delete application 336. Additionally, the monitoring application can identify the snapshots that are located in the delete queue 324. In this way, the monitoring application 336 is capable of tracking the delete state of each snapshot for a particular backing store. In accordance with one embodiment of the present invention, the monitoring application 340 is operable to identify when all of the snapshots stored in association with a given backing store are either marked for deletion (i.e., are in the delete queue 324) or are currently being deleted.

An additional application that may be stored in the controller code 332 includes a re-initialization application 344. The re-initialization application 344 is characterized by the ability to simultaneously delete a number of snapshots at substantially the same time. In accordance with embodiments of the present invention, the re-initialization application 344 is afforded the ability to delete multiple snapshots simultaneously by re-initializing the backing store that contains the snapshots that are being deleted. The re-initialization application 344 may receive instructions to re-initialize a backing store from the monitoring application 340 when the monitoring application 340 determines that all of the snapshots associated with a given backing store comprise a delete state (i.e., are either being deleted or are marked for deletion).

The snapshot delete queue 324 is provided to support the limitations of the snapshot delete application 336, namely the snapshot delete application's 336 inability to simultaneously process multiple snapshots, and more particularly the inability to simultaneously process multiple snapshots from the same backing store. Accordingly, the snapshot delete application 336 individually processes snapshots one at a time and retrieves the next snapshot from the snapshot delete queue 324 for processing.

In accordance with at least some embodiments of the present invention, the re-initialization application 344 possesses the ability to delete a number of snapshots from the snapshot delete queue 324 at the same time. More specifically, the re-initialization application 344 is capable of deleting all snapshots in the snapshot delete queue 324 that are associated with a common backing store. This may mean that the re-initialization application 344 can delete all of the snapshots from the snapshot delete queue 324, if all of the snapshots in the snapshot delete queue 324 are associated with a backing store set for re-initialization. Alternatively, the re-initialization application 344 may only delete a sub-set of snapshots from the snapshot delete queue 324 in the event that other snapshots in the snapshot delete queue are not associated with a backing store set for re-initialization.

A storage controller 212 may additionally include other components. For example, a bus and/or network interface 348 may be provided for operably interconnecting the storage controller 212 to the remainder of the data storage system 104, for example through a controller slot 208 and a bus or channel 216. Furthermore, the interface 348 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
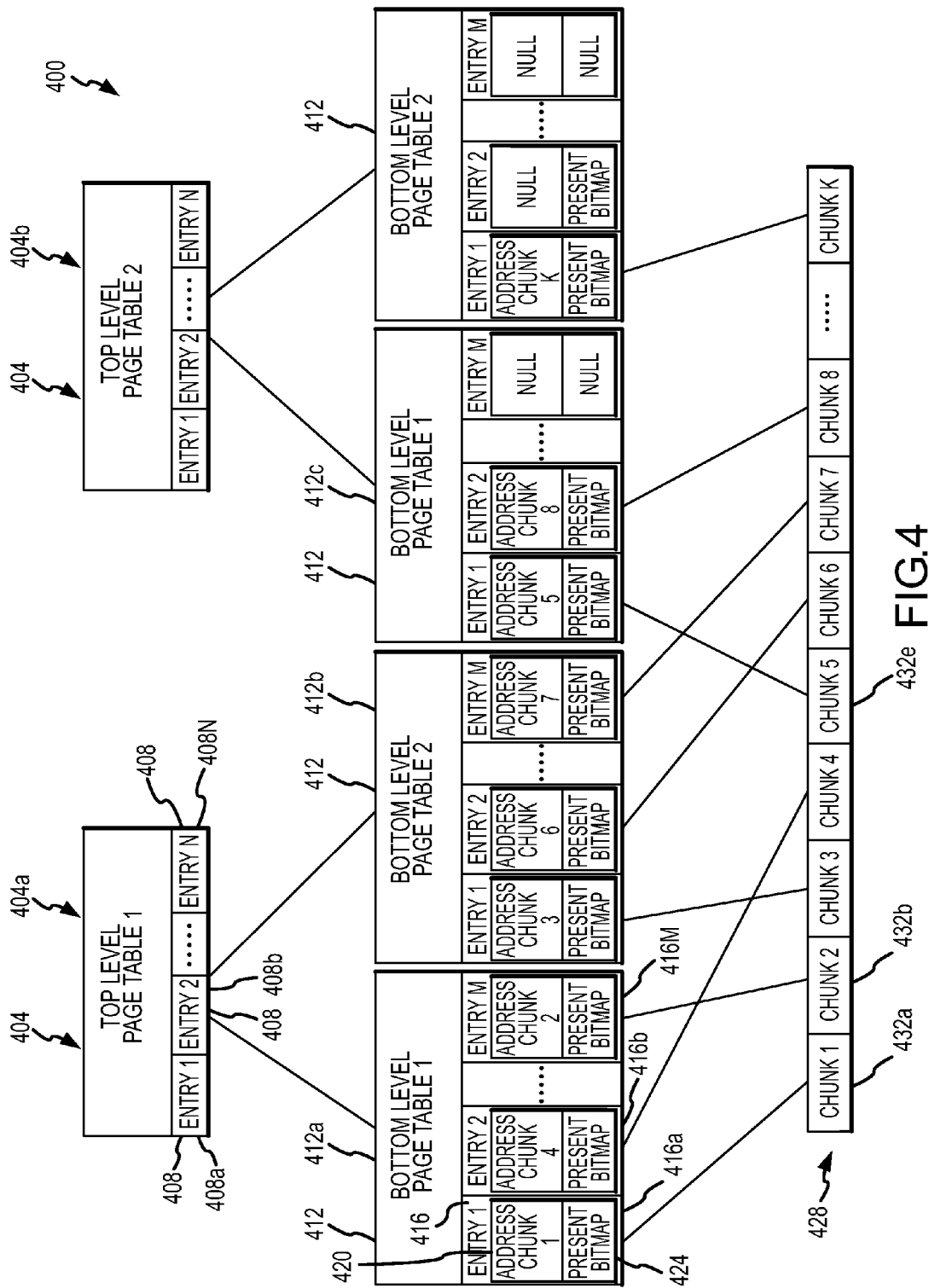
FIG. 4 is a block diagram depicting an exemplary data structure employed for storing snapshots in accordance with embodiments of the present invention.

FIG. 4 depicts a data structure 400 employed in association with the storage of snapshot data on a backing store. A Top Level Page Table (TLPT) 404 is created when a snapshot is taken of a master volume. As noted above, a snapshot represents a point in time of the master volume when the snapshot is taken. A newer snapshot of the master volume is represented by the first TLPT 404a and an older snapshot of the same master volume is represented by the second TLPT 404b. In one embodiment, preserved master data is only copied to the newest snapshot when there is a write of data to the master volume. This process may be referred to as a copy on write procedure. As a result of a snapshot only being updated with a copy on write, it is possible that the older snapshot represented by the second TLPT 404b does not contain a pointer or table entry for all data from the master volume at the time the older snapshot was taken. Rather, data stored on the master volume at the time the older snapshot was taken may be preserved in association with the first TLPT 404a if that data was not written until after the newer snapshot was taken. As can be appreciated, the number of TLPTs 404 stored depends upon the number of snapshots taken and the memory capacity of the backing store.

A TLPT 404 generally comprises a list of pointers, where each pointer points to a different Bottom Level Page Table (BLPT) 412. The pointers to each BLPT 412 are typically stored in the TLPT 404 as a TLPT Entries (TLPTEs) 408. Each TLPTE 408 does not necessarily need to point to a BLPT, meaning that a TLPTE 408 can have a null value until additional snapshot data needs to stored in association with the TLPT 404. Accordingly, when a snapshot of a master volume is taken, a TLPT 404 can be created with TLPTEs 408a-N, where N is typically greater than or equal to one. In one embodiment, upon creation of a snapshot, a TLPT 404 is created with a number of TLPTEs 408a-N. These TLPTEs 408a-N are initially empty (i.e., have a null value). Each TLPTE 408 corresponds to a BLPT 412 and therefore a range of BLPT Entries (BLPTEs) 416. A structure of BLPTEs 416 are also created with each BLPTE 416 being reserved to point at a particular chunk 432 corresponding to a Logical Block Address (LBA) on the master volume. However, since data from the master volume is only written to the backing store when the master volume is being rewritten the BLPTEs 416 are initially null as well. As the operation of the master volume continues some of the TLPTEs 408a-N may eventually have pointers to BLPTs 412, whereas other TLPTEs 408a-N may be empty. A pointer included in a TLPTE 408 is generally stored as a memory address of the BLPT and generally has a size of about 4 bytes but can have a size of up to about 8 bytes. Although the TLPTEs 408a-N are shown being filled in order (i.e., the first TLPTE 408a is filled before the second TLPTE 408b which is filled before the Nth TLPTE 408N), the order in which TLPTEs 408a-N are populated may be arbitrary.

The BLPTs 412a-N contain pointers, stored as BLPTEs 416, that point to actual preserved data or write data for the snapshot associated with the corresponding TLPT 404. In one embodiment, each BLPTE 416a-M represents a range or "chunk" that comprises at least a subset of the snapshot data 432a-K on the backing store 428. An address chunk identifier 420 identifies the location of the corresponding chunk of data 432 on the backing store 428. A chunk 432 stores data that provides a moment in time picture of an LBA on the master volume. Therefore, two different chunks 432 can store data related to the same LBA but taken at different times.

Each chunk 432a-K may be further divided into subchunks via the use of a present bitmap 424. Although described as a bitmap, one skilled in the art will appreciate that the present bitmap 424 may be replaced with any other type of data table or map used to organize and manage chunk and subchunk data. The present bitmap 424 information stored in the BLPTE 416 can be used to indicate where that subchunk is located within the chunk 432, either on the backing store 428 or on the master volume and if the subchunk contains user data. In accordance with one embodiment, each chunk 432 corresponds to about 2 MB of memory and each subchunk corresponds to about 64 KB of memory. As can be appreciated by one skilled in the art, the chunk address identifiers 420 for each BLPTE 416 in a BLPT 412 does not need to be assigned to a chunk 432 consecutively as shown in FIG. 4. For example, the Mth BLPTE 416 of the first BLPT 404a could be allocated before first BLPTE 416 of the first BLPT 404a. However, in other embodiments, the BLPTEs 416 could be assigned chunks 432 consecutively to make assignment of chunks more orderly.

The controller 212 uses a hierarchical system of pointers to store snapshot data so that read and write commands for the snapshot data can be quickly and efficiently executed. When a snapshot read command is received by the controller 212, the controller 212 can quickly locate a portion of snapshot data by first identifying the TLPT 404 corresponding to the requested snapshot then drill down to the requested data using the pointers in the TLPT 404 and BLPT 412. If the controller 212 determines that the data is not on the requested snapshot (e.g., 404b), the controller 212 will search for a newer snapshot (e.g., 404a). If the data is not on the newer snapshot (e.g., 404a), then the data will be on the master volume. However, in accordance with one embodiment of the present invention, when a newer snapshot is deleted, the controller 212 will ensure that data which should be stored on an older snapshot but was stored on the snapshot being deleted is preserved in the older snapshot before the newer snapshot is deleted so that such data is not lost.

Although the data structure 400 employed in accordance with preserving snapshot data is depicted and described as having two levels of entries (i.e., top levels and bottom levels), it can be appreciated by one of skill in the art that a greater or lesser number of levels may be employed. For instance, several levels of entries may be utilized. Additionally, aspects of the present invention may be employed with different levels of indirect page tables. Furthermore, other types of snapshot data structures may be employed in accordance with embodiments of the present invention such as B-Trees and other similar quick-lookup data structures.

Figure 5:
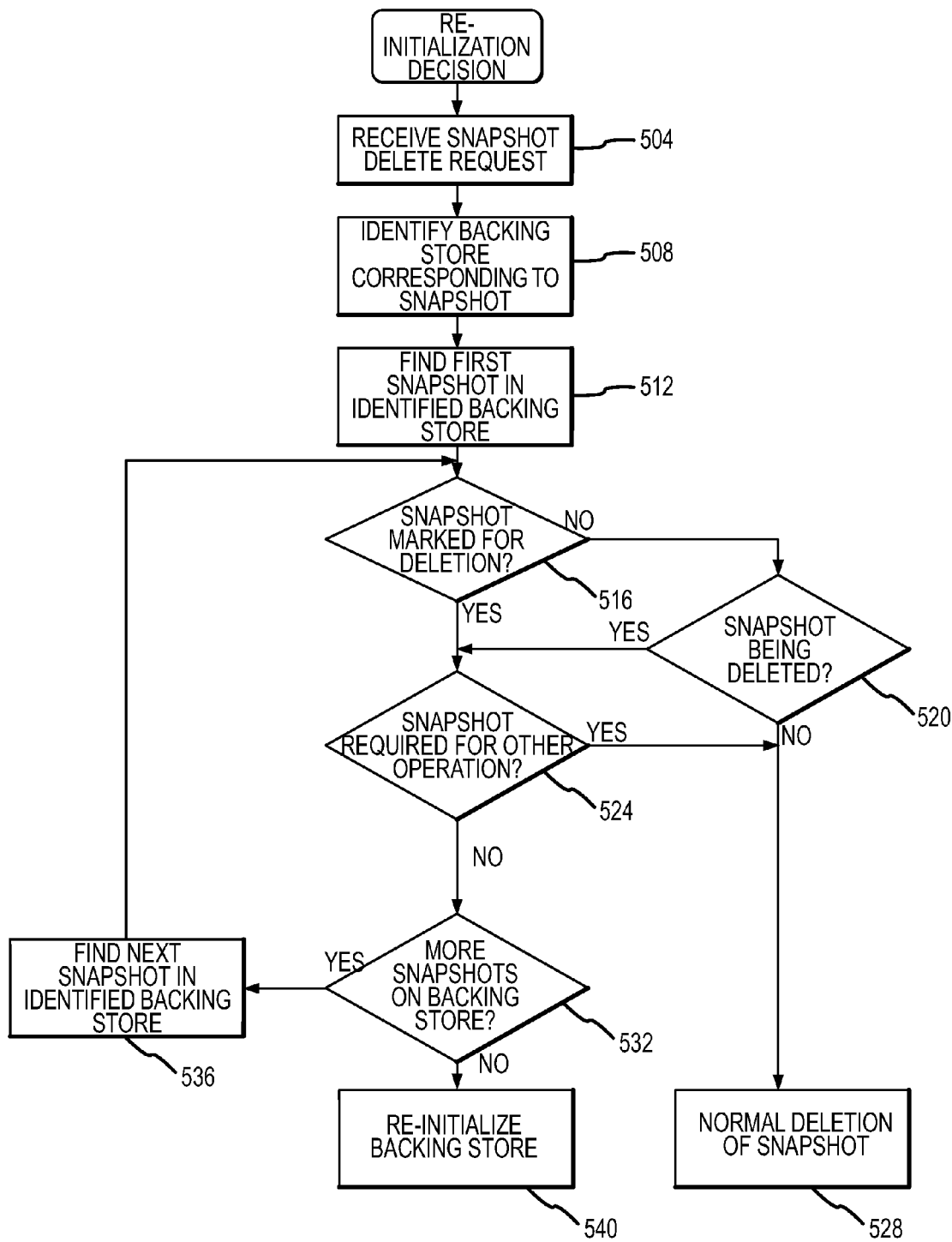
FIG. 5 is a flow chart depicting aspects of making a decision to re-initialize a backing store in accordance with embodiments of the present invention.

Referring now to FIG. 5, a method of making a re-initialization decision for a backing store will be described in accordance with at least some embodiments of the present invention. Initially, the controller 212 receives a command to delete a snapshot 404 from a backing store (step 504). One reason that a user may wish to delete a snapshot 404 is to free up memory space on the backing store or to erase a snapshot that is preserving corrupted data. In response to receiving the request to delete the snapshot 404, the controller 212 identifies the backing store corresponding to the snapshot 404 (step 508). In other words, the controller 212 identifies the backing store that contains the data of the snapshot 404 which has been requested for deletion. The identification of the backing store may be discovered using, for example, data stored in the volume control block 206 and/or volume information block 328. A unique identifier such as a randomly assigned serial number may be used to identify the backing store. Alternatively, the backing store may be identified by the LBAs corresponding to the backing store or by the identification of the snapshot(s) 404 stored on the backing store.

Once the proper backing store has been identified, the method proceeds by locating a first snapshot 404a in the identified backing store (step 512). The first snapshot 404a may be the oldest snapshot stored on the backing store. In one embodiment, the first snapshot 404a may be the same snapshot that has been marked for deletion. However, if multiple snapshots 404 are stored on the backing store, then the possibility exists that the first snapshot 404a is not the same as the snapshot 404 that has been requested for deletion.

Similar to identifying the proper backing store, the volume control block 206 and/or volume information block 328 may be referenced by the controller 212 to locate the first snapshot 404a. In accordance with one embodiment of the present invention, locating a snapshot 404 does not necessarily require identifying the chunks 432 used to store the snapshot data. Rather, a snapshot 404 may be located by locating metadata and state data associated with the snapshot 404 stored on the volume control block 206 and/or volume information block 328. In other words, identifying the state of a snapshot 404 may sufficiently constitute locating the snapshot 404 in accordance with embodiments of the present invention.

Upon locating the first snapshot 404a in the backing store, it is determined whether the first snapshot 404a is already marked for deletion (step 516). The controller 212 may employ the monitoring application 340 to make this particular determination. In accordance with one embodiment of the present invention, the monitoring application 340 references the deletion flag for the first snapshot 404a, which may be stored within the volume control block 206. If the flag indicates that the first snapshot 404a is not marked for deletion, then the monitoring application 340 continues by determining if the first snapshot 404a is currently being deleted (step 520). The monitoring application 340 may make this determination by referencing the volume control block 206 to determine the state of the first snapshot's 404a delete in progress flag. Alternatively, the monitoring application 340 may directly analyze the snapshot delete application 336 to determine if the snapshot delete application 336 is active. If the snapshot delete application 336 is active, then the monitoring application 340 may request the identity of the snapshot 404 currently being processed by the snapshot delete application 336.

In the event that the first snapshot 404a is not being deleted, then the monitoring application 340 has identified that at least one snapshot 404 on the backing store does not have a delete state. That is, since at least the first snapshot 404a does not have a delete state, the monitoring application 340 will not issue a request to re-initialize the backing store. Rather, the snapshot 404 requested for deletion will undergo the normal deletion process (step 528). The normal deletion process may comprise the snapshot delete application 336 processing the subject snapshot 404. However, if the snapshot delete application 336 is currently deleting another snapshot 404, then the subject snapshot is placed in the delete queue 324.

On the other hand, if the monitoring application 340 determines that the first snapshot 404a does have a delete state, either due to the fact that the first snapshot 404a is marked for deletion or being deleted, then the monitoring application 340 determines whether the first snapshot 404a is required for another operation/task or is currently in use by another application (step 524). Simply because a snapshot 404 is marked for deletion does not mean that its data is not still in use by another application or task. For example, if a master volume is currently undergoing a rollback procedure to a point-in-time associated with a particular snapshot, then that snapshot and possibly other snapshots may still be required for that procedure. Consequently, the deletion of those snapshots may be delayed until the rollback process is complete. For this reason, if the monitoring application 340 determines that the first snapshot 404a is required by another application, then the snapshot 404 requested for deletion is deleted pursuant to normal snapshot deletion methods (step 528). Of course, the monitoring application 340 may determine that the application using the first snapshot 404a is almost finished with the first snapshot 404a, in which case the monitoring application 340 may delay the decision of step 524.

If the monitoring application 340 determines that the first snapshot 404a has a delete state and the first snapshot 404a is not currently in use by another application, then the monitoring application 340 determines if there are more snapshots 404 stored on the identified backing store (step 532). This determination may be made by referencing the volume control block master group data stored in association with the volume control block 206. If additional snapshots 404 are stored on the backing store, then the monitoring application 340 locates the next snapshot 404 (step 536). The next snapshot 404 in the backing store may be located in a similar fashion to the way the first snapshot 404a was located on the backing store at step 512. Thereafter, the method returns to step 516, where it is determined if the next snapshot 404 is marked for deletion.

The monitoring application 340 will continue checking the delete state and utilization of each snapshot 404 for the identified backing store until either one snapshot 404 is identified as not having a delete state or one snapshot 404 is being used by another application. If the monitoring application 340 ultimately determines that every snapshot 404 associated with the identified backing store comprises a delete state and is not being used by another application, then the monitoring application 340 issues a re-initialize command to the re-initialization application (step 540).

Figure 6:
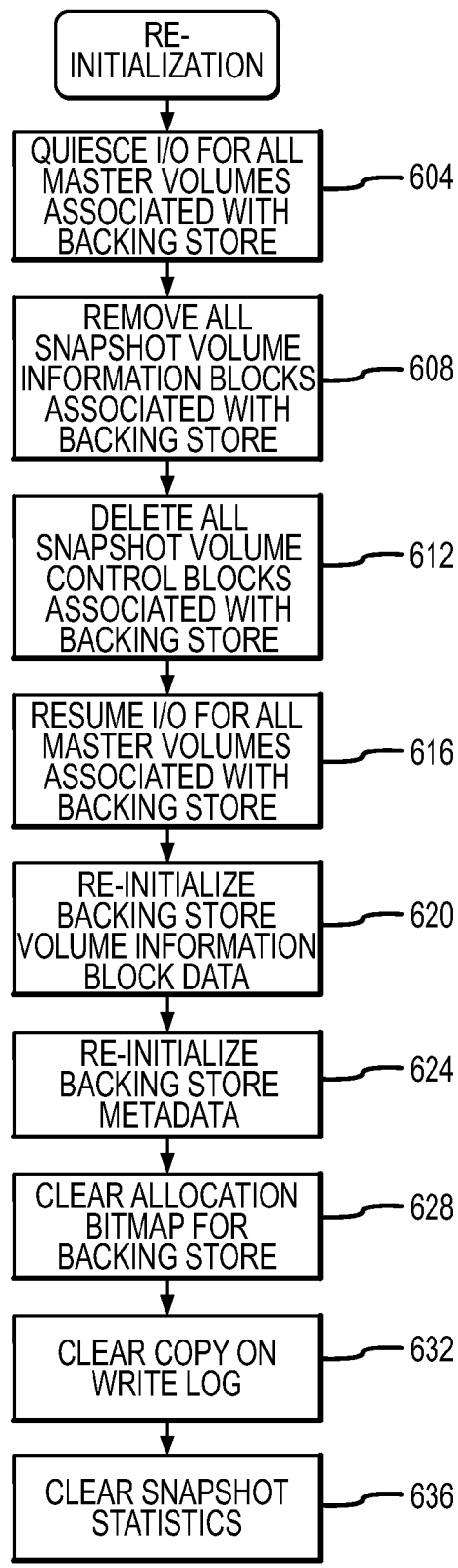
FIG. 6 is a flow chart depicting aspects of a re-initialization process in accordance with embodiments of the present invention.

FIG. 6 is a flow chart depicting a method of re-initializing a backing store in accordance with at least some embodiments of the present invention. The re-initialization method is initiated upon the re-initialization application 344 receiving a re-initialization command from the monitoring application 340. Upon determining that re-initialization of the backing store is proper, the re-initialization application 344 begins by placing a quiesce on the I/O commands for all master volumes associated with the backing store being re-initialized (step 604). As noted above, a single backing store may be used to store snapshots of a number of different master volumes. The master volumes associated with the backing store may be associated by referencing the volume control block master group data stored in connection with the volume control block 206. When the backing store is marked for re-initialization, the execution of an input or output command for one of the master volumes may result in data corruption. Accordingly, the I/O commands for all of the master volumes are quiesced. A "quiesce", as used herein, is understood to mean temporarily causing the I/O commands for the master volumes to go into an inactive state. During the quiesce the controller 212 treats the master volumes as though they are in an inactive state. A computer resource that is in a quiesced state can be reactivated more quickly than one that has been completely removed from the system.

Once the I/O commands for the master volumes have been quiesced, the re-initialization application 344 proceeds by removing all snapshot volume information blocks 328 that are associated with the backing store (step 608). In other words, the volume information blocks 328 corresponding to all snapshots stored on the backing store are removed from the non-volatile memory 310. However, in accordance with certain embodiments of the present invention, the volume information blocks 328 are stored in volatile memory 312. In the case of a power loss, crash, or reboot, the volume information block 328 may be reconstructed from a volume control block 206.

Upon removal of the volume information blocks 328, the re-initialization application 344 deletes all snapshot volume control blocks 206 associated with the backing store (step 612). The volume control blocks 206 corresponding to snapshots stored on the backing store are deleted from their respective storage device 204. After the appropriate volume information blocks 328 and volume control blocks 206 have been deleted, the controller 212 can safely execute I/O commands for the master volumes associated with the backing store without risking data corruption. Therefore, the quiesce on the I/O commands for the master volumes associated with the backing store is released and I/O processes are resumed (step 616).

Following the release of the quiesce on the I/O commands, the re-initialization application 344 re-initializes the backing store volume information block 328 data (step 620). In this step the various metadata relating to the backing store is updated to reflect the deletion of all snapshots from the backing store. As an example, sparselock controls, delete information, rollback information, log wait list information, cache, free chunk lists, and other data are cleared from the volume information block 328 for the backing store. Thereafter, the backing store metadata is re-initialized (step 624). During re-initialization of the backing store metadata certain types of metadata such as backing store version number, used chunk count data, and the like are cleared or re-written with a null value. However, it should be noted that user-defined metadata is retained in connection with the backing store. User-defined metadata includes, for example, policy information regarding how to manage the backing store.

After the metadata of the backing store has been re-initialized, the re-initialization application 344 clears the data maps 210 for the backing store (step 628). The re-initialization application 344 may write null values to each data map 210 previously used to indicate that the chunk is used on the backing store. By clearing the data map 210, the chunks previously used by the deleted snapshots 424 are free for use by another snapshot. If a new snapshot is created, the snapshot may use the now clear data map 210 to point to a given chunk 432 of data. Furthermore, the data map 210 may be updated to indicate that the particular chunk 432 is now being used by another snapshot. Accordingly, the re-initialization application 344 can reset the backing store and create space for new snapshots without actually deleting data from the chunks 432. Instead, the re-initialization application 344 clears the data maps 210 thereby freeing up the chunk 432 for use by other snapshots.

Once the data maps 210 have been cleared, the re-initialization application 344 clears a copy on write log (step 632). The copy on write log may have been stored on a storage device 204, for example on the backing store itself. The copy on write log is basically a historical record of the copy on write commands executed for each snapshot on a given backing store. The copy on write log is generally used to ensure that copy on write commands have been performed. Since all of the snapshots 404 associated with the backing store have been deleted, the copy on write log is no longer accurate and should be deleted. Therefore, the copy on write log for the backing store can start from scratch when a new snapshot is created on the backing store. In addition to clearing the copy on write log, any other snapshot statistics maintained on the backing store may be deleted (step 636). Examples of snapshots statistics that may be cleared from the backing store include the number of snapshots stored on the backing store, the relative age of each snapshot, the associated master volumes, and the like.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A snapshot deletion method, comprising:
receiving, at a controller, a request to delete a snapshot associated with a backing store, wherein the backing store provides storage for the snapshot data and metadata, wherein the backing store is not associated with a LUN;
determining, by the controller, that all other snapshots associated with the backing store are at least one of being deleted and marked for deletion; and
in response to determining that all other snapshots associated with the backing store are at least one of being deleted and marked for deletion, foregoing deleting only the requested snapshot and re-initializing the backing store such that all snapshots associated therewith are deleted at substantially the same time.

2. The method of claim 1, wherein re-initializing comprises freeing all Logical Block Address (LBA) ranges associated with the snapshot associated with the backing store.

3. The method of claim 1, wherein re-initializing comprises clearing data maps that are associated with the snapshots, wherein each data map provides an indication whether or not an LBA range is allocated to a particular snapshot from the backing store.

4. The method of claim 3, further comprising maintaining data on each LBA range while the data maps are cleared.

5. The method of claim 1, further comprising:
determining that at least one snapshot associated with the backing store is being used in a task on a master volume; and
waiting until at least one of (i) the task is complete and (ii) the task is aborted;
determining that no task is in process for the backing store; and
after determining that there is no task dependent on snapshot data stored on the backing store, invoking the re-initialization of the backing store.

6. The method of claim 1, further comprising:
determining that a first snapshot associated with the backing store is being deleted and all other snapshots associated with the backing store are marked for deletion;
in response to determining that a first snapshot associated with the backing store is being deleted and all other snapshots associated with the backing store are marked for deletion, stopping the deletion process of the first snapshot; and
after the deletion process of the first snapshot has been stopped, invoking the re-initialization of the backing store.

7. The method of claim 1, wherein re-initialization comprises first deleting internal structures and memory associated with mapping the backing store and second re-initializing metadata associated with the backing store while keeping at least some data related to the backing store.

8. A storage system controller, comprising:
controller code including:
a deletion monitoring application operable to monitor a deletion state of each snapshot in a backing store, wherein the backing store provides storage for the data and metadata of each snapshot, wherein the deletion monitoring application receives a request to delete a snapshot, wherein the deletion monitoring application determines if each snapshot in the backing store comprises a delete state, wherein the backing store is not associated with a LUN;
a snapshot delete application operable to independently delete snapshot data associated with the backing store, wherein the snapshot delete application deletes the requested snapshot if the deletion monitoring application determines that less than all snapshots in the backing store comprises a delete state; and
a re-initialization application operable to re-initialize the backing store, thereby deleting all snapshots associated with the backing store at substantially the same time, if the deletion monitoring application determines that all snapshots in the backing store comprises a delete state; and
a processor operable to execute the controller code.

9. The device of claim 8, wherein a snapshot comprises a delete state when the snapshot is at least one of currently being deleted and marked for deletion.

10. The device of claim 8, wherein the deletion monitoring application is further operable to identify the deletion state of each snapshot by referencing a deletion flag of each snapshot, wherein the deletion flag indicates the deletion state of the corresponding snapshot.

11. The device of claim 8, further comprising a data map used to identify if a Logical Block Address (LBA) range is allocated to snapshot data, wherein the re-initialization application is adapted to re-initialize the backing store by clearing the data map thereby allowing the data map to be used by new snapshot data stored in the backing store.

12. The device of claim 11, further comprising memory, wherein at least a portion of the data map is in the memory.

13. The device of claim 11, wherein at least a portion of the data map is maintained on a storage device.

14. A snapshot management device, comprising:
   means for receiving a snapshot delete request;
   means for monitoring the means for independently deleting snapshots;
   means for independently deleting snapshots from a backing store in response a snapshot delete command received at the means for receiving, wherein the backing store provides storage for snapshot data and metadata, wherein the means for independently deleting snapshots is engaged in response to the means for receiving a snapshot delete requests receiving a snapshot delete request and the means for monitoring determining that less than all snapshots associated with the backing store are one of queued and engaged by the means for independently deleting snapshots, wherein the backing store is not associated with a LUN; and
   means for re-initializing the backing store, wherein the means for re-initializing the backing store is engaged in response to the means for receiving a snapshot delete requests receiving a snapshot delete request and the means for monitoring determining that all snapshots associated with the backing store are one of queued and engaged by the means for independently deleting snapshots, wherein the means for re-initializing is adapted to delete all snapshots associated with the backing store at substantially the same time.

15. The device of claim 14, wherein the means for monitoring is further operable to identify whether at least one of the snapshots associated with the backing store is involved in another application and delay the means for re-initializing until the application is at least one of completed and aborted.

16. The device of claim 14, further comprising means for storing a data map, wherein the data map comprises chunks that are assignable to a Logical Block Address (LBA) range such that the data map indicates whether data associated with a snapshot is being stored on the assigned LBA range.

17. The device of claim 16, wherein the means for re-initializing the backing store is further operable to clear the data map thereby allowing the chunk to be assigned to new snapshots.

18. The device of claim 14, wherein the means for re-initializing comprises a means for quiescing inputs and outputs for all master volumes associated with the backing store.

19. The device of claim 14, further comprising means for storing at least one of volume information blocks and volume control blocks, wherein the volume information blocks and volume control blocks comprise data for locating a data map, and wherein the means for re-initializing is further operable to remove all volume information blocks and volume control blocks associated with the snapshots associated from the backing store.

20. The device of claim 19, wherein the volume control blocks at least partially reside on a data storage device.

\* \* \* \* \*